US012399929B2

(12) United States Patent
Clark et al.

(10) Patent No.: US 12,399,929 B2
(45) Date of Patent: Aug. 26, 2025

(54) SECURITY EVENT CHARACTERIZATION AND RESPONSE

(71) Applicant: Sensormatic Electronics, LLC, Boca Raton, FL (US)

(72) Inventors: John J. Clark, Boynton Beach, FL (US); Adam S. Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 18/411,854

(22) Filed: Jan. 12, 2024

(65) Prior Publication Data

US 2024/0241903 A1    Jul. 18, 2024

Related U.S. Application Data

(60) Provisional application No. 63/479,984, filed on Jan. 13, 2023.

(51) Int. Cl.
*G06F 16/43* (2019.01)
*G06V 20/52* (2022.01)
*G06V 40/20* (2022.01)

(52) U.S. Cl.
CPC .............. *G06F 16/43* (2019.01); *G06V 20/52* (2022.01); *G06V 40/25* (2022.01)

(58) Field of Classification Search
CPC ......... G06F 16/43; G06V 40/25; G06V 20/52
See application file for complete search history.

(56) References Cited

U.S. PATENT DOCUMENTS

| 9,432,632 B2* | 8/2016 | Cheng ...................... H04N 7/18 |
| 10,290,031 B2 | 5/2019 | Reid et al. |

(Continued)

FOREIGN PATENT DOCUMENTS

| WO | 2021067197 A1 | 4/2021 |
| WO | 2021186149 A1 | 9/2021 |

OTHER PUBLICATIONS

International Search Report issued in corresponding International Application No. PCT/US2024/011524 dated May 16, 2024.

(Continued)

*Primary Examiner* — Etienne P Leroux
(74) *Attorney, Agent, or Firm* — ArentFox Schiff LLP

(57) ABSTRACT

Security event characterization and response includes, for each of a plurality of first security data collection events determining that the first event has started. Collecting, in a database, an event data record associated with the first event determined to have started, the event data record comprising gait information of a person associated with the first event. For a given security data collection event later than the plurality of first events, determining that the given event has started. Detecting given event data comprising gait information of a person associated with the given event determined to have started. Determining a similarity meeting a threshold similarity between the query and one or more sets of records of the database. Initiating an action based on the one or more sets of records of the database determined to meet a threshold similarity with the query.

20 Claims, 6 Drawing Sheets

(56) References Cited

U.S. PATENT DOCUMENTS

| | | | | |
|---|---|---|---|---|
| 2007/0263907 | A1* | 11/2007 | McMakin | G06V 40/25 |
| | | | | 382/107 |
| 2016/0269411 | A1* | 9/2016 | Malachi | H04L 63/0421 |
| 2021/0097832 | A1* | 4/2021 | Bergman | G06V 10/811 |
| 2022/0346670 | A1* | 11/2022 | Chen | A61B 5/7282 |
| 2023/0048282 | A1* | 2/2023 | Hanson | G06V 20/597 |
| 2023/0410616 | A1* | 12/2023 | Carlson | G08B 13/08 |

OTHER PUBLICATIONS

Otzurk, et al., Gait-based people Identification with Millimeter-Wave Radio, 2021 IEEE 7th World Forum on Internet of Things (WF-IoT) 978-1-6654-4431-6/21.

* cited by examiner

SECURITY EVENT CHARACTERIZATION AND RESPONSE

CROSS REFERENCE TO RELATED APPLICATIONS

The present application claims the benefit of U.S. Prov. Pat. App. No. 63/479,984, of the same title and filed on Jan. 13, 2023; the entirety of which is incorporated herein by reference.

BACKGROUND

The present disclosure relates generally to security systems, and more particularly, to systems and methods for characterizing and response to security events.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In some examples, systems, methods, and computer program products for security event characterization and response are disclosed herein. In some examples, security event characterization and response includes, for each of a plurality of first security data collection events, determining that the first event has started. Collecting, in a database, an event data record associated with the first event determined to have started, the event data record comprising gait information of a person associated with the first event. For a given security data collection event later than the plurality of first events, determining that the given event has started. Detecting given event data comprising gait information of a person associated with the given event determined to have started. Determining a similarity meeting a threshold similarity between the query and one or more sets of records of the database. Initiating an action based on the one or more sets of records of the database determined to meet a threshold similarity with the query.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
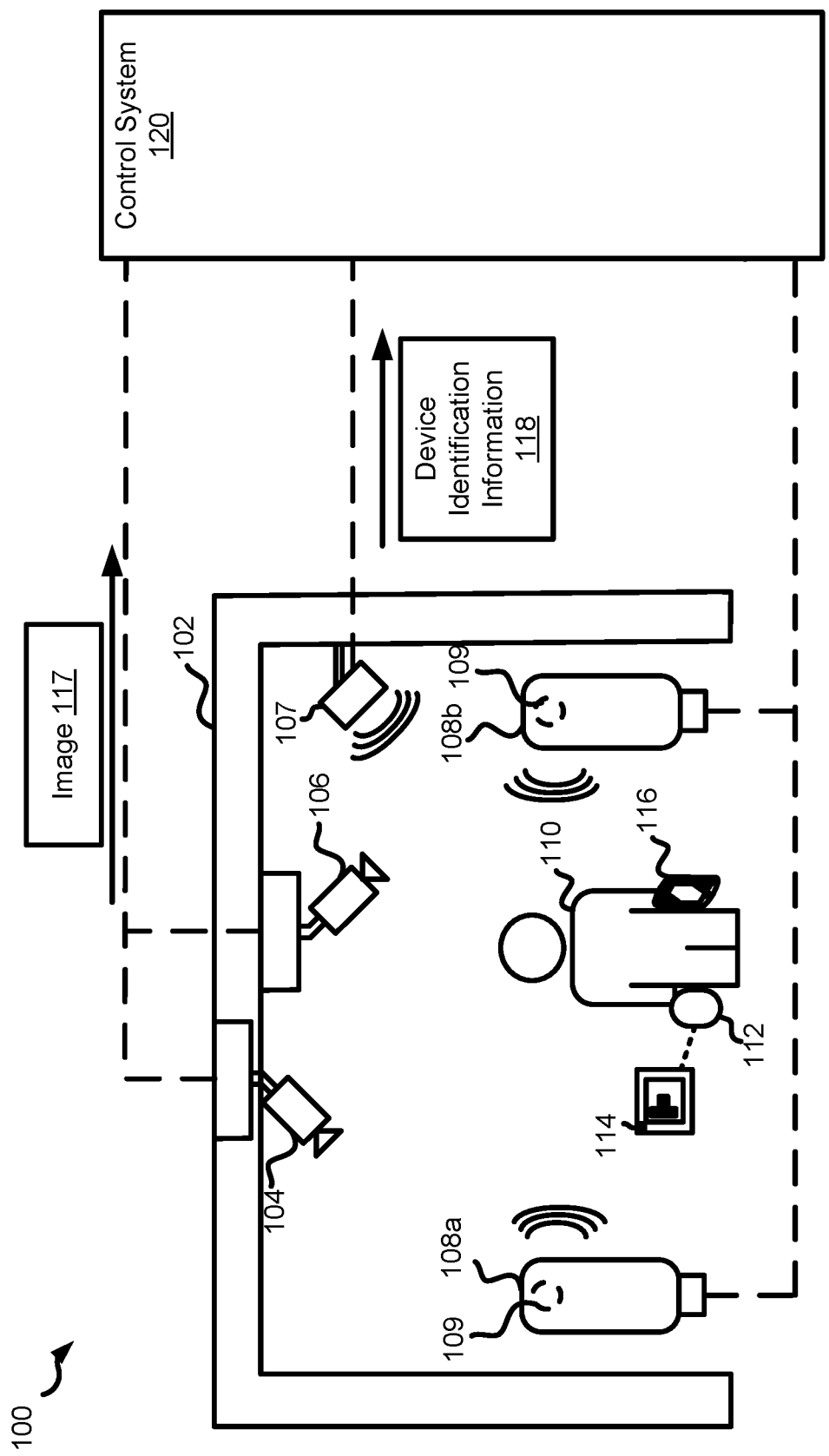
FIG. 1 is a block diagram of an example security system, according to implementations of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

In many retail stores, there is a need of acting on a detected security event, e.g., identifying persons of interest (POI) in the context of potential theft incidents. Typical electronic article surveillance (EAS) systems merely provide an alarm to notify store clerks of an individual leaving a store without paying for a product. This means the individual may have already performed the theft and may escape without being caught by law enforcement officials.

In addition, retailers are struggling with organized retail theft from stores. They are looking for a way to proactively identify persons or groups that are participating in organized retail theft so action can be taken before the theft occurs. Examples of the technology disclosed herein can identify those individuals or groups based on associating gait and body biometrics with EAS alarms at a retail store. Using this data to create a system that can be accessed as a service by any retailer regardless of whether the retailer uses EAS exit systems. Examples of the technology disclosed herein do not have the same issues as facial recognition systems that are easy to defeat with facial covering such as medical masks, sunglasses, hats or other disguises. Examples of the technology disclosed herein also may not have the same privacy issues associate with facial recognition system. It is not easy to alter or disguise a person's gait and body biometrics, so it would provide a higher level of function to detect repeat theft offenders with identifying rates up to 97% for this type of technology. Examples of the technology disclosed herein can help retailers (an managers of any other controlled area) identify potential thefts (or other actions) and take actions before the theft takes place as most retailers have policies not to pursue after the theft.

The present disclosure addresses one or more shortcomings of a typical EAS system by providing systems and methods for relating a present event characterized by biometric data including gait with prior similar events. In an example, a system implemented according to the present disclosure may build an index of confidence scores and POIs based on characteristics including gait and wireless (e.g., Wi-Fi or Bluetooth) identifying technologies operating simultaneously. The system may derive a confidence score for associating a present event with prior events based on these technologies. Further, the system may identify an individual as a POI (e.g., potential shoplifting suspect) as the individual enters the store (i.e., before the individual has shoplifted). In other words, the system may identify the individual as a POI based on a confidence score generated from past actions by one or more candidates profiled by characteristics including gait and one or more prior collection events.

The systems and methods described herein may offer a pro-active opportunity to stop potential theft before it happens. One benefit of this solution is that the confidence in a notification according to the present disclosure may be higher than those of a typical EAS system due to a linking of a biometric characteristics including at least gait with prior collection events.

In some examples, the technology includes video and/or other technologies such as millimeter (mm) wave transceivers to detect the physical characteristics of a person's gait and body biometrics. During a collection event (e.g., as a person passes through the exit system and an active AM/RFID EAS tag is detected and alarms the system) the biometrics data of the persons gait and body is associated with that event. That corollary information is stored in a local and/or cloud-based system and a profile is created for that gait/body biometric instance. The system records each collection event (e.g., an instance of an alarm) associated with the same gait/body biometrics data and based on the type and frequency of collection events (e.g., outbound AM/RFID EAS alarms) may identify that profile as a potential repeat theft offender. The system then monitors incoming pedestrian traffic into/near the retail store and determines gait/body biometrics of each person (e.g., entering a store or parking area). Those biometrics are compared to the online profiles. If a profile match meeting a certain threshold level is found with one or more recorded collection events (e.g., AM/RFID EAS alarm events), an action (e.g., the retailer being notified that a possible repeat offender entered the retail store with the entry timestamp) can be taken. The retailer can use the store CCTV system to identify and track the person and perform any preemptive measures to discourage the theft before it takes place. Additionally, the gait/biometric characteristics can be combined with other attributes of the potential repeat offender such as Wi-Fi or Bluetooth associated with the person's device. In combining other attributes, a confidence factor or score can be generated depending on the number of attributes in agreement on a particular repeat offender candidate.

The technology disclosed herein in unlike facial recognition alone, is more difficult to defeat and may not have the same privacy implications. In some examples, the technology disclosed herein does not rely primarily on the detection of electronic devices such as cell phones that could easily uniquely identify a person, which can be simply turned off or left outside the retail store.

In some examples, the technology disclosed herein can both collect data from and monitor not just one facility, but multiple facilities—e.g., including across disparate retailers. In some examples, the collection database and comparison functions can be cloud-based, or offered as software-as-a-service (SaaS).

Turning now to the figures, example aspects are depicted with reference to one or more components described herein, where components in dashed lines may be optional.

Referring to FIG. 1, an example security system 100 deployed at a facility (e.g., store) 102 is depicted. In general, the facility 102 can be any controlled area. The security system 100 may include, for example, one or more outside-facing cameras 104 facing out from an entrance of the facility 102 and one or more inside-facing cameras 106 facing inward from the entrance of the facility 102. The cameras 104, 106 may capture an image 117 (e.g., video image or photographic image) of individuals (e.g., individual 110) entering and/or exiting the facility 102. The security system 100 may also include, for example, one or more non-camera sensors 107 such as millimeter (MM) wave transceivers that collect data that allows the security system 100 to identify biometric characteristics, such as gait, of a person in the field of view of the non-camera sensor 107. Examples of a non-camera sensors 107 also include a network sniffer, packet sniffer, packet analyzer, wireless device identification determiners that attempt to identify a wireless device (e.g., wireless device 116 associated with individual 110) entering and/or exiting the facility 102 and collect a corresponding device identification information 118 or any other device capable of capturing a device identification from a wireless device.

Some examples of the technology disclose herein generate confidence scores of persons of interest (POIs), which can include individuals believed to have engaged in theft of items (e.g., item 112) from the facility 102 or another establishment, or at least associated with one or more previous security events, based on a combination of the image 117 and biometric information including gait information. Correspondingly, the present implementations provide mechanisms to alert security personal of the entrance of an identified person of interest into the facility 102.

In an example, an individual 110 may exit the facility 102 by passing through one or more pedestal scanners 108a and 108b. When the individual 110 purchases an item 112, an electronic tag 114 (e.g., a radio frequency identifier (RFID) tag, an acousto-magnetic tag, or any other type of EAS device) on the item 112 may be removed or deactivated so that it will not be detected by the scanners 108a and 108b.

In some instances, the individual 110 may steal or not purchase the item 112, therefore the electronic tag 114 is not deactivated or removed. In this case, when the individual 110 exits from the facility 102, the pedestal scanners 108a and 108b may detect that the item 112 with the electronic tag 114 is located near the scanners, and that the item 112 is being carried out of the facility 102 without having been purchased by the individual 110. As such, the pedestal scanners 108a and 108b and/or the control system 120 may activate one or more notification devices 109, such as an audio alarm device, a strobe or flashing light device, and/or a notification message sent to security or store personnel to notify the personnel about the security event or potential theft.

Concurrently, as the individual 110 is just prior to exiting the facility 102, or as they are exiting, or after they have exited, the inside-facing camera 106 and/or the outside-facing camera 104 may capture an image 117 (e.g., via recorded video or photographic image) of the individual 110 exiting the facility 102 and send the image 117 to the control system 120 for processing, as described in further detail herein. Further, the non-camera sensors 107 may concurrently attempt to 1) detect gait, and/or 2) detect the wireless device 116. For example, the non-camera sensors 107 may attempt to detect a device identification (e.g., media access control (MAC) address, an Internet Protocol address, or any other type of unique device identifier) of the wireless device 116 by scanning Wi-Fi, Bluetooth, and/or any other wireless protocol. The non-camera sensors 107 may send device identification information 118, including biometric information such as gait information, and device identification of the wireless device 116, to the control system 120 for processing, as described in further detail herein. Based on the images 117, gait information, and the device identification information 118, the control system 120 may generate a confidence score corresponding to the individual 110 and store the confidence score along with person of interest (POI) information (e.g., image of POI or device identification of wireless device corresponding to POI) for future detections, as described in more detail herein.

In an aspect, the confidence score along with the POI information may be shared with other establishments. Further, when a subsequent security event occurs (at the facility 102 or another establishment) and a second image corresponding to the security event or a second device identification corresponding to the security event matches those of the POI information, the confidence score corresponding to the POI information may be updated based on the subsequent security event. For example, a subsequent confidence score corresponding to subsequent security event may be calculated, and when a feature set (e.g., gait) of the second image or the second device identification match the POI information, the second confidence score may be added to the confidence score and stored as the confidence score corresponding to the POI. This multi-factor (e.g., image plus device identification) confidence score may ultimately be used to proactively notify store or security or law enforcement personnel of a potential POI upon the corresponding individual being detected as entering a store.

Figure 2:
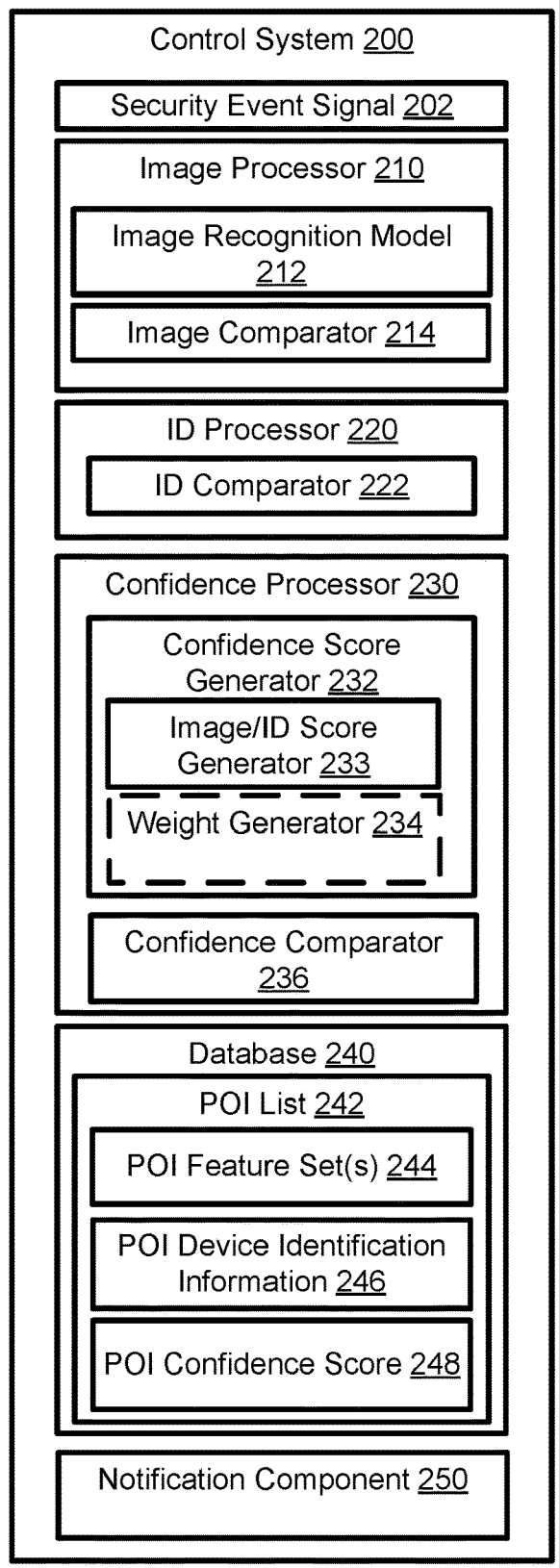
FIG. 2 is a block diagram of an example control system implemented by the security system of FIG. 1, according to implementations of the present disclosure.

Referring to FIG. 2, details of the control system 120 in relation to the individual 110 exiting the facility 102 are depicted as control system 200. In an example, the control system 200 may generate a security event signal 202 when the item 112 is being carried out of the facility 102 without having been purchased by the individual 110. The security event signal 202 may signal to the pedestal scanners 108a and 108b to send an alert (e.g., via notification devices 109), to the inside-facing camera 106 and/or the outside-facing camera 104 to capture the image 117, and to the non-camera sensors 107 to detect i) gait or ii) device identification of the wireless device 116.

The control system 200 may include an image processor 210 configured to process the image 117. In an example, the image processor 210 may obtain the image 117 from the cameras 104 and 106, in response to the security event signal 202. In an example, one or more of the images 117 may be captured from a timeframe that spans before and after the security event signal 202, e.g., within a certain threshold time.

The image processor 210 may also include an image recognition model 212 configured to identify a feature set (e.g., facial features, other biometric characteristics including gait) of the image 117 corresponding to the individual 110. In an example, the image recognition model 212 may include an image comparator 216 configured to compare the feature set of the image 117 with one or more POI feature sets 244 stored in a database 240.

The control system 200 may include an ID processor 220 configured to process the device identification information 118. In an example, the ID processor 220 may determine whether the device identification information 118 corresponds to the security event based on the captured time of the device identification information 118. In an example, the ID processor 220 may include an ID comparator 222 configured to compare the device identification information 118 to POI device identification information 246 stored in the database 240. In addition, control system 200 may include gait processor (not shown) configured to determine a gait of the individual 110.

The control system 120 may include a confidence processor 230 configured to generate and/or update a confidence score corresponding to a POI. In an example, if the image comparator 214 or the ID comparator 222 determines a match, a confidence score corresponding to the POI may be updated. Otherwise, the POI is a new POI and a new confidence score is generated.

The confidence processor 230 may include an image/ID score generator configured to generate an image score (e.g., first score) and an ID score (e.g., second score) corresponding to the security event. In an example, if the image recognition model 212 identifies a feature set of the image 117, the image score may be scored at a predetermined value (e.g., 1), and if the image recognition model 212 does not identify a feature set of the image 117, the image score may be scored at second predetermined value (e.g., 0). Further, if the ID processor 220 obtains a device identification of the wireless device 116 from the device identification information 118, the ID score may be scored at a predetermined value (e.g., 1), and if the ID processor 220 does not obtain the device identification, the ID score may be scored at second predetermined value (e.g., 0).

In some examples, the confidence processor 230 may include a weight generator 234 which weights the image score and/or the ID score. In an example, the weight generator 234 may weight one of the image score or the ID score over the other. For example, the ID score may be weighted at a percentage (e.g., 50%) of the image score such that if both a feature set and a device identification are identified, the image score is, for example, 1 and the ID score is 0.5.

The confidence processor 232 may generate a confidence score based on the image score and the ID score. For example, the confidence score may be the sum of the image score and the ID score. However, other algorithms and calculations may be used, including those considering the weight of the image score and the ID score.

The confidence processor 232 may store the calculated confidence score in the database 240 as the POI confidence score 248. In an example, the POI list 242 may associate the POI confidence score 248 with the one or more of the POI feature sets 244 or the POI device identification information 246.

In an example, the security system 100 may also alert personnel when a POI enters the facility 102 based on the POI confidence score 248. In an example, the security system 100 may maintain a confidence threshold corresponding to the POI confidence score 248. When the individual 110 and/or the wireless device 116 enters the facility 102, the security system 100 may determine that the individual 110 is a POI. For example, the inside-facing camera 106 and/or the outside-facing camera 104 may capture an image 117 (e.g., via recorded video or photographic image) of the individual 110 entering the facility 102 and send the image 117 to the control system 200 for comparison to POI information (e.g., gait), as described in further detail herein. Further, the non-camera sensors 107 may concurrently attempt i) to determine a gait of the individual 110 entering the facility 102, and/or ii) to detect the wireless device 116 entering the facility 102 by scanning Wi-Fi, Bluetooth, and/or any other wireless protocol to determine a device identification (e.g., MAC address) of the wireless device 116. The non-camera sensors 107 may send the gait information and/or the device identification information 118, including device identification of the wireless device 116, to the control system 200 for comparison to the POI information, as described in further detail herein. Based on the images 117 and the device identification information 118, the control system 200 may determine the individual is a POI when, for example, a feature set of the image 117 or the device identification information 118 matches the POI information. In response to determining that the individual is a POI, the security system 100 may compare the confidence score corresponding to the POI with the confidence threshold. When the confidence score exceeds the confidence threshold, this means the POI (e.g., individual 110) has been involved in a sufficient number of security events that security personnel should be notified of the POI's presence in the facility 102. When the confidence score does not exceed the confidence threshold, it may mean that the POI has not been involved in enough security events to warrant a notification to security personnel of the facility 102.

Referring to FIG. 2, the control system 200 in relation to the individual 110 entering the facility 102 are depicted. In an aspect, the image processor 210 may receive the image 117 corresponding to the individual 110 entering the facility 102, and the image comparator 214 may compare a feature set of the image 117 to the POI feature sets 244 to determine whether the individual 110 is a POI. Further, the ID processor 220 may receive the device identification information 118, and the ID comparator 222 may compare any device identification to the POI device identification information 246 to determine whether the individual 110 is a POI. In other words, if one or more of the image comparator 214 or the ID comparator 222 determines a match, the individual 110 is determined to be a POI.

The confidence processor 230 further includes a confidence comparator 236 configured to determine whether to alert a security personnel based on the POI confidence score 248. For example, once the individual 110 is determined to be a POI, the confidence comparator 236 compares the POI confidence score 248 (e.g., 10) with a confidence threshold value (e.g., 9). When the POI confidence score 248 is greater than the confidence threshold value, this may indicate that the POI was involved in multiple security events at the facility 102 and/or other establishments. Otherwise, when the POI confidence score 248 is not greater than the confidence threshold value, this may indicate that the POI was not involved in a sufficient number of security events to warrant the involvement of security personnel.

The control system 200 may include a notification component 250 configured to alert a security personnel regarding the POI confidence score 248 of the individual 110 exceeding the confidence threshold value. In an example, the notification component 250 may include a wired or wireless transceiver configured to transmit one or more notifications (e.g., email, text, alarm) to a device used by the security personnel.

Accordingly, the security system 100 may provide mechanisms to build a profile of a POI based on information obtained as the individual 110 exits the facility 102 (or another establishment) and a proactive approach to identify the individual 110 when entering the facility 102 (or another establishment) and to alert security personnel based on the POI information.

Figure 3:
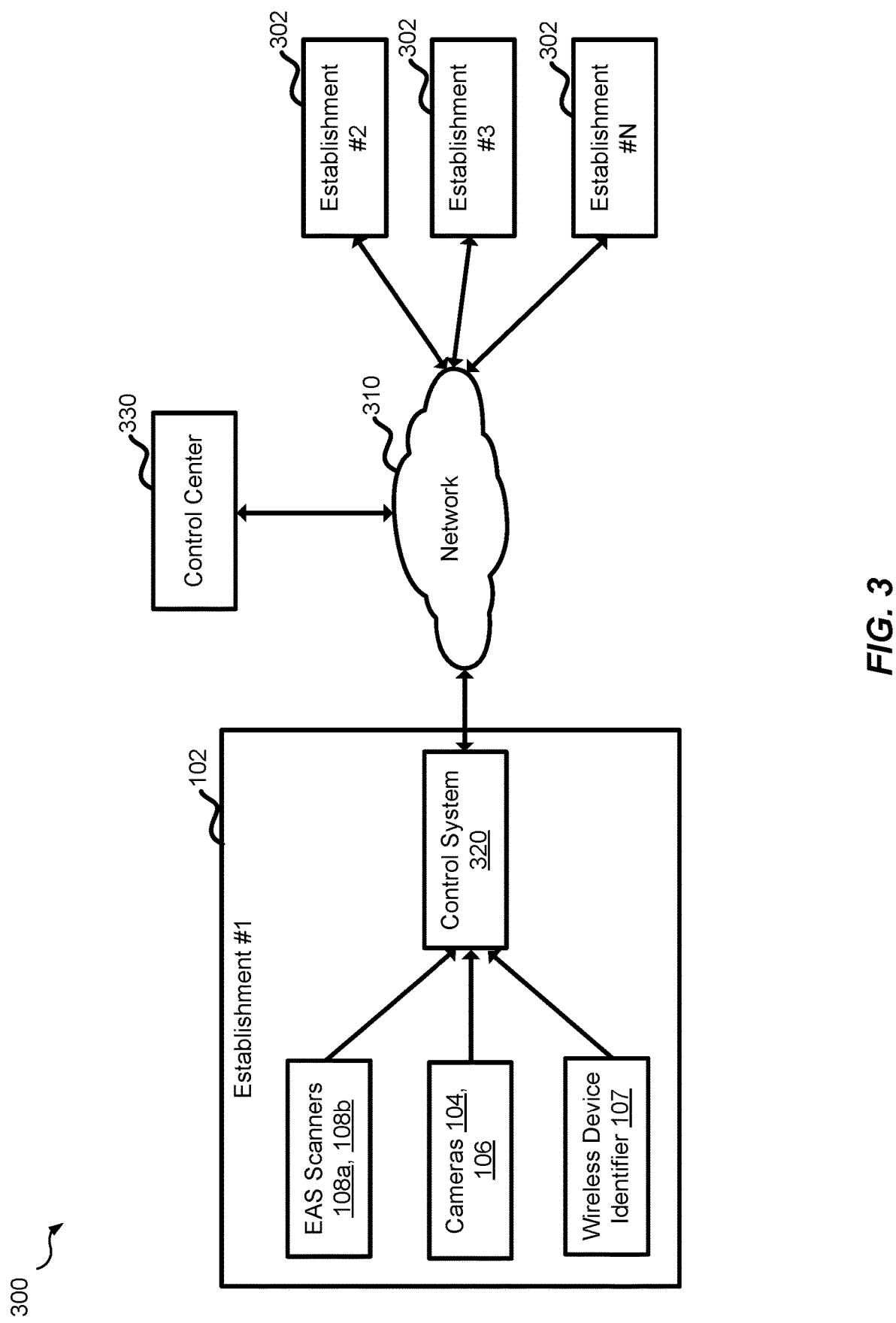
FIG. 3 is a block diagram of an example security system of FIG. 1 implemented with other security systems, according to implementations of the present disclosure.

Referring to FIG. 3, an example security system 300 configured for multiple establishments is depicted, in accordance with examples of the technology disclosed herein. In an example, the facility 102 may be one of many establishments in the security system 300. For example, the facility 102 may communicate with one or more additional establishments 302 via a network 310 to share POI information including images 117 and device identification information 118 for security purposes, as described herein. In some examples, the facility 102 may include the control system 320, which performs all functions of the control system 120. In another example, the security system 300 may also include a control center 330 which, in conjunction with the control system 320, performs all functions of the control system 120.

Figure 4:
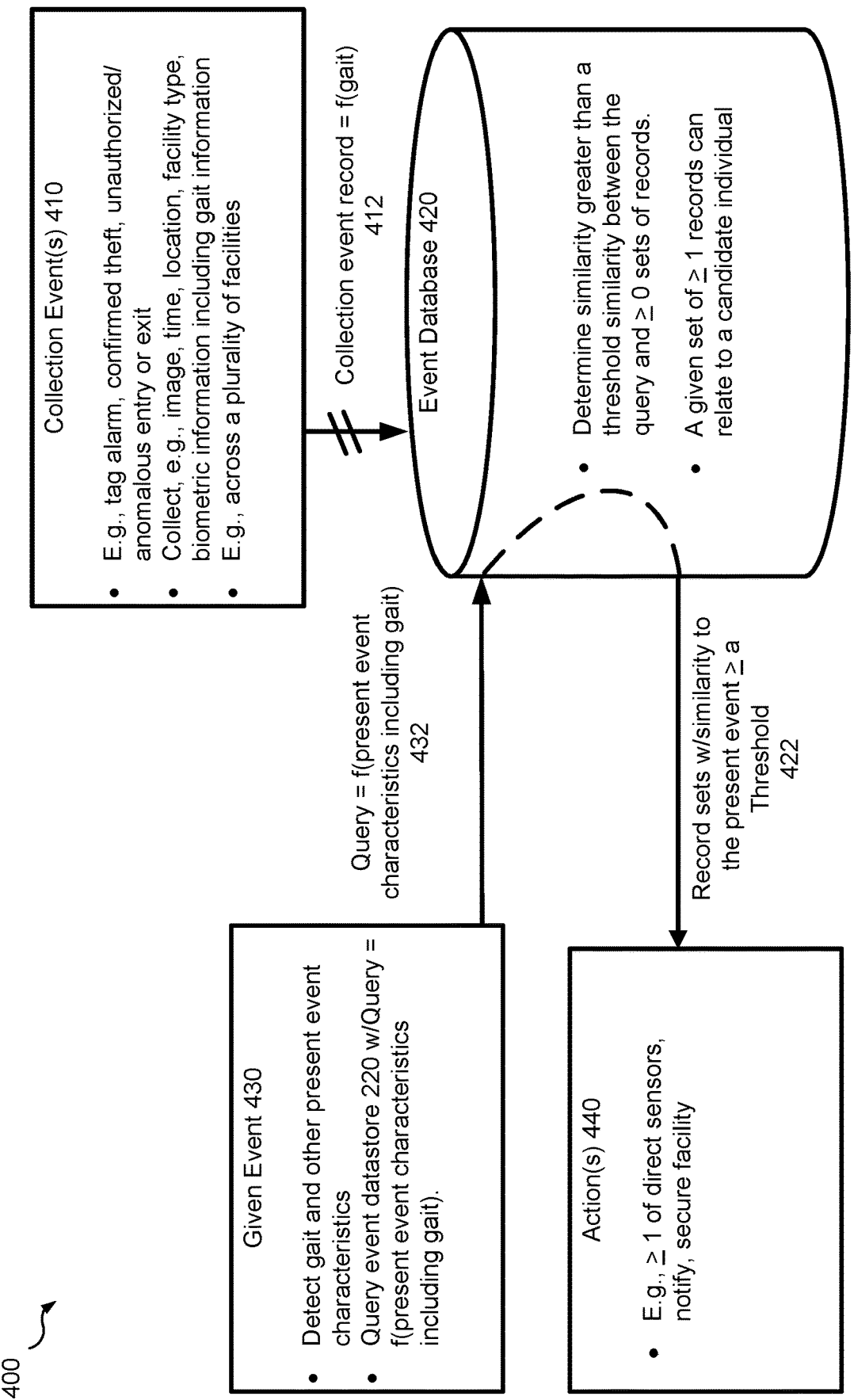
FIG. 4 is an architecture for methods, systems, and computer program products for security event characterization, in accordance with examples of the technology disclosed herein.
Figure 5:
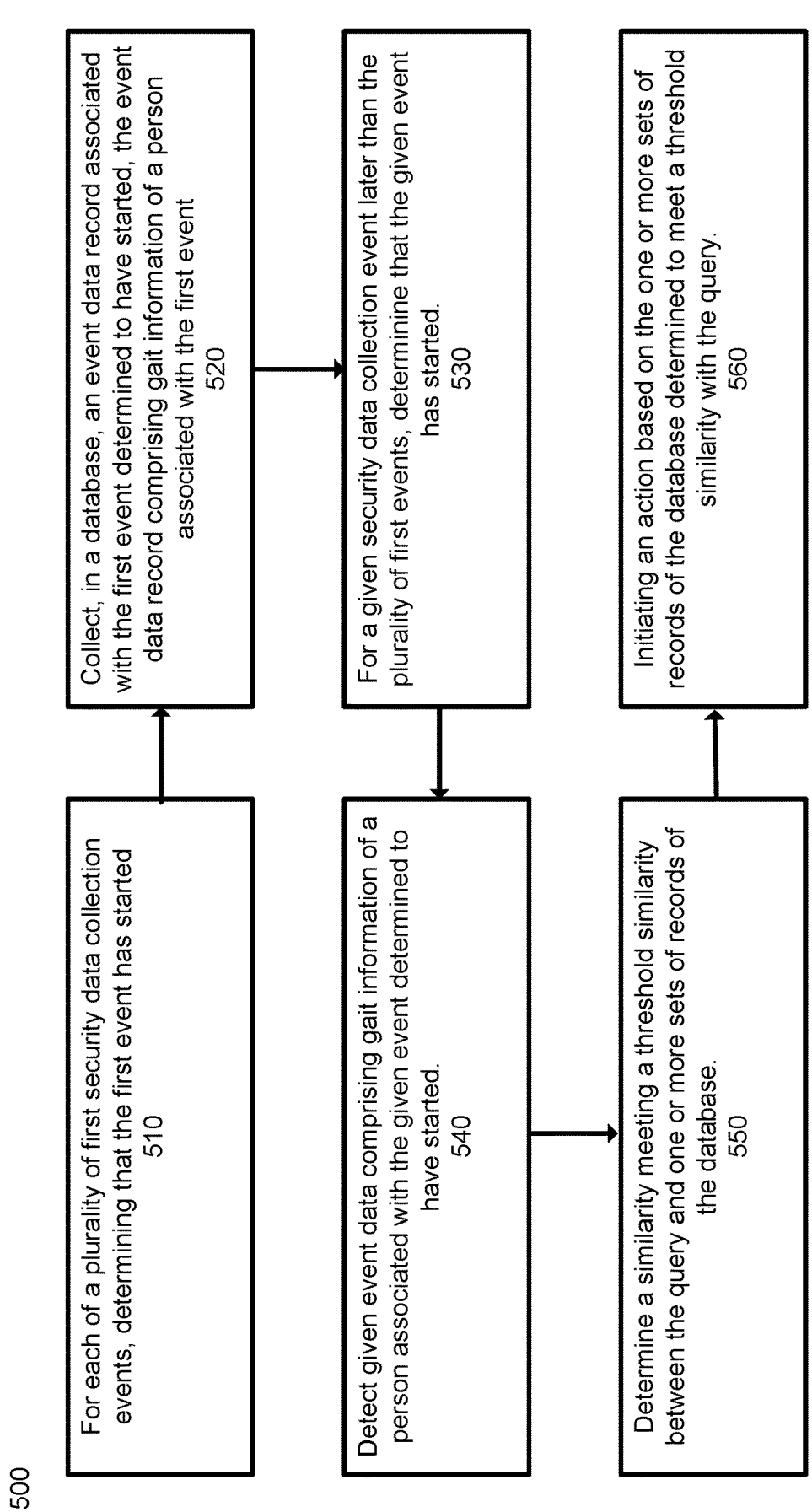
FIG. 5 is a flowchart of an example method implemented by the security system of FIG. 1, according to implementations of the present disclosure.

Referring to FIG. 4, an architecture 400 for methods, systems, and computer program products for security event characterization and response are shown, in accordance with examples of the technology disclosed herein. Referring to FIG. 5, an example method 500 for security event characterization and response is depicted. The operations of the method 500 may be performed by one or more components of the system 100, 200, or 300 (referred to below as "system 100"), as described herein. In such methods 500, for each of a plurality of first security data collection events, system 100 determines that the first event has started—Block 510. In a continuing example, system 100 identifies collection events 410 such as an EAS tag alarm, a confirmed theft, or an unauthorized/anomalous entry or exit from facility 102. However, the first event need not be a tag alarm and need not be from the same facility. First security data collection events can be from one or more different facilities.

The system 100 then collects, in a database such as event database 420, an event data record 412 associated with the first event determined to have started—Block 520. In the continuing example, each event data record 412 includes gait information of a person associated with the first event. In some examples, collecting includes collecting gait information using at least one of a video imaging device (e.g., 104, 106) and a millimeter wave transceiver (e.g., 107). Each event data record 412 can include other information such as images, time of collection, location of collection, facility type, facility identifier, and other biometric information. The event data records 412 can be collected from one facility or across a number of facilities.

For a given security data collection event later than the plurality of first events, the system 100 determines that the given event has started—Block 530. While the given event can be an EAS tag alarm, the given event can be other events, e.g., the presence of an individual near (e.g., outside in a parking lot) or just entering a controlled area (e.g., facility 102).

The system 100 then detects given event data—Block 540. The given event data includes gait information of a person associated with the given event determined to have started.

The system 100 then determines a similarity, meeting a threshold similarity, between the query and one or more sets of records of the database—Block 550. In the continuing example, at least one of the sets of records of the database determined to meet a threshold similarity with the query is a set of records associated with a single individual. However, this does not have to be the case. One or more of the records could be not mapped to a particular individual. In the continuing example, several sets of records determined to meet a threshold similarity to the query are found. The sets of records are presented along with the similarity measure, or in order of decreasing similarity to the query. Where a set of records is associated with an individual, a confidence level (as described elsewhere herein) that the individual is a repeat offender is also returned.

The system 100 then initiates an action based on the one or more sets of records of the database determined to meet a threshold similarity with the query—Block 560. In the continuing example, initiating an action includes one of more of notifying a party that the given event meets a threshold similarity with one or more sets of records of the database; directing one or more sensors towards one or more of a person or an area associated with the given event; and securing the controlled area.

In a further example, methods include determining a security event has occurred. For example, the control system 120, 200, or control center 320 may determine a security event has occurred based on receiving the security event signal 202 from the pedestal scanners 108a and 108b when the item 112 having the electronic tag 114 is located near the scanners.

Such examples include obtaining, from a camera, an image corresponding to the security event. For example, one or more of the control system 120, 200, or control center 320, the image processor 210, or the image recognition model 212 may receive the image 117 (e.g., video image or photographic image) from the one or more of the cameras 104 or 106 corresponding to the security event signal 202 being received. In some such examples, one or more of the control system 120, 200, or control center 320), the image processor 210, or the image recognition model 212 may transmit instructions to the camera 104/106 to capture the image 117 in response to the security event. The one or more of the control system 120, 200, or control center 320, the image processor 210, or the image recognition model 212 may receive the image 117 in response to the transmitted instructions.

Such examples include generating a first score corresponding to a POI based on whether an individual is detected in the image. For example, one or more of the control system 120, 200, or control center 320, the confidence processor 230, the confidence score generator 232, or the image/ID score generator 233 may generate an image score (e.g., first score) corresponding to one or more of an individual 110 or a feature set of the individual 110 being detected in the image 117. In some such examples, when the individual 110 and/or a feature set of the individual 110 is identified in the image, the image score may have a value of 1, and when the not identified, the image score may have a value of 0.

Such examples include causing a wireless device identification determiner to search for a device identification of a wireless device corresponding to the security event. For example, one or more of the control system 120, 200, or control center 320 or the ID processor 220 may cause the non-camera sensors 107 to search for a device identification information 118 of the wireless device 116 corresponding to the security event. In some such examples, one or more of the control system 120, 200, or control center 320, the image processor 210, or the image recognition model 212 transmits instructions to the non-camera sensors 107 to search for the device identification information 118 in response to the security event. The one or more of the control system 120, 200, or control center 320, the image processor 210, or the image recognition model 212 may receive the device identification information 118 in response to the transmitted instructions.

Such examples include generating a second score corresponding to the person of interest based on whether the device identification is identified. For example, one or more of the control system 120, 200, or control center 320, the confidence processor 230, the confidence score generator 232, or the image/ID score generator 233 may generate an ID score (e.g., second score) corresponding to the POI based on whether the device identification is identified. In some such examples, when the device identification is identified, the ID score may have a value of 1, and when the device identification is not identified, the ID score may have a value of 0.

Such examples may optionally include weighting one or more of the first score or the second score. For example, one or more of the control system 120, 200, or control center 320, the confidence processor 230, the confidence score generator 232, the image/ID score generator 233, or the weight generator 234 may weight one or more of the image score or the ID score. In some such examples, the image score may be weighted higher than the ID score. For example, the ID score may be weighted at a percentage (e.g., 50%) of the image score.

Such examples include generating a confidence score corresponding to the POI based on the first score and the second score. For example, one or more of the control system 120, 200, or control center 320, the confidence processor 230, or the confidence score generator 232 may generate a confidence score corresponding to the POI based on the image score and the ID score. In some such examples, the confidence score may be generated by summing the image score and the ID score (with or without the weighting, depending on the example).

Such examples include storing the confidence score in correlation with POI information in a database. For example, one or more of the control system 120, 200, or control center 320, the confidence processor 230, or the confidence score generator 232 may store the confidence score as POI confidence score 248 and associate the confidence score with POI information such as POI feature sets 244 and/or POI device identification information 246 in the database 240.

In an additional example, the system 100 obtains, from the camera, an image corresponding to an entrance of an individual. For example, one or more of the control system 120, 200, or control center 320, the image processor 210, or the image recognition model 212 may receive the image 117 (e.g., video image or photographic image) from the one or more of the cameras 104 or 106 corresponding to an entrance of the individual 110 at the facility 102. In some such examples, one or more of the control system 120, 200, or control center 320, the image processor 210, or the image recognition model 212 may transmit instructions to the camera 104/106 to capture the image 117 in response to the entrance. The one or more of the control system 120, 200, or control center 320, the image processor 210, or the image recognition model 212 may receive the image 117 in response to the transmitted instructions.

Such additional examples include causing a wireless device identification determiner to search for a device identification of a wireless device corresponding to the entrance of the individual. For example, one or more of the control system 120, 200, or control center 320 or the ID processor 220 may cause the non-camera sensors 107 to search for a device identification of the wireless device 116 corresponding to the entrance of the individual 110 into the facility 102. In an example, one or more of the control system 120, 200, or control center 320, the image processor 210, or the image recognition model 212 may transmit instructions to the non-camera sensors 107 to search for the device identification information 118 in response to the entrance. The one or more of the control system 120, 200, or control center 320, the image processor 210, or the image recognition model 212 may receive the device identification information 118 in response to the transmitted instructions.

Such additional examples include determining whether the individual is a POI based on one or more of the image or the device identification. For example, one or more of the control system 120, 200, or control center 320, the image processor 210, the image recognition model 212, the image comparator 214, the ID processor 220, or the ID comparator may determine whether the individual 110 is a POI. In some such examples, the individual 110 may be a POI based on a match between a feature set of the image 117 to one or more POI feature sets 244, and/or the individual 110 may be a POI based on a match between a device identification of the wireless device 116 and a POI device identification information 246.

Such additional examples include determining a confidence score corresponding to the person of interest in response to determining the individual is the person of interest. For example, one or more of the control system 120, 200, or control center 320, the confidence processor 230, or the confidence comparator 236 may determine a confidence score corresponding to the POI in response to determining the individual 110 is the POI. In an example, one or more of the control system 120, 200, or control center 320, the confidence processor 230, or the confidence comparator 236 may read the POI confidence score 248 associated with the POI information, including the POI feature set 244 and/or the POI device identification information 246, stored in the database 240 and/or the POI list 242.

Such additional examples include transmitting a notification of the POI to a device in response to the confidence score exceeding a confidence threshold. For example, one or more of the control system 120, 200, or control center 320 or the notification component 250 may transmit a notification such as an email, text, or alert to a device associated with security personnel when the confidence score exceeds a confidence threshold value. In some such examples, one or more of the control system 120, 200, or control center 320 or the confidence comparator 236 may compare the POI confidence score 248 associated with the POI to a confidence threshold value to determine whether to transmit the notification.

Figure 6:
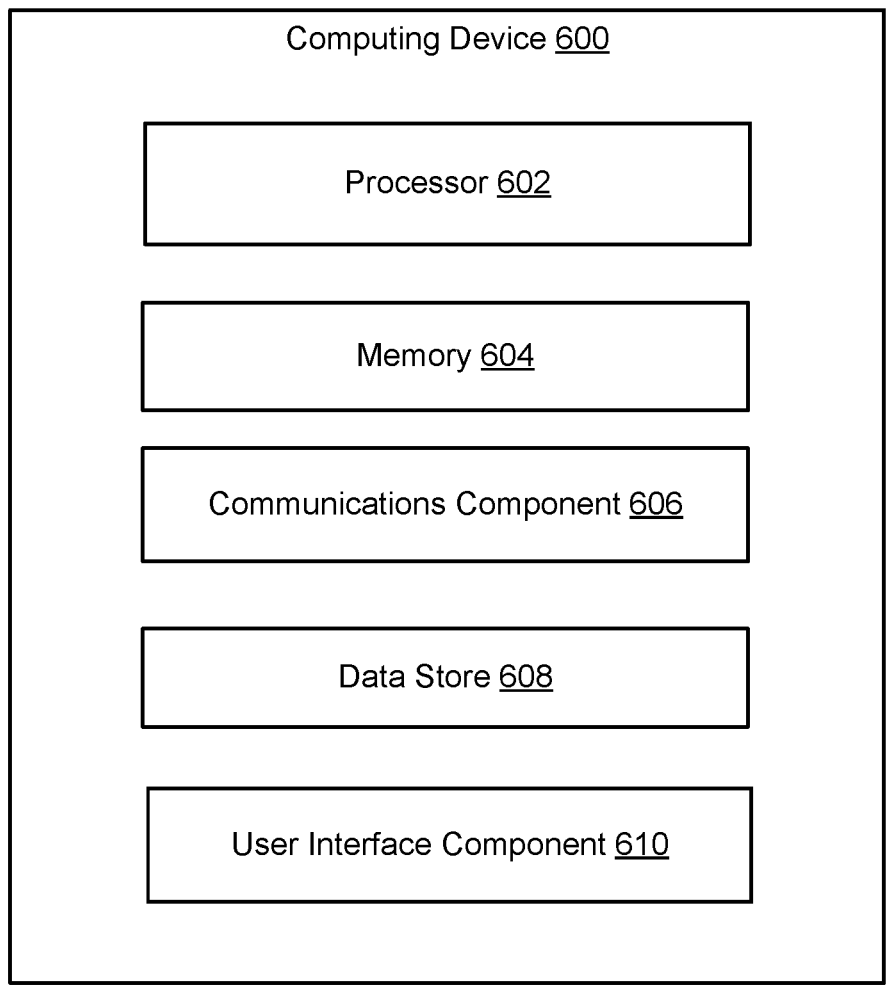
FIG. 6 is a block diagram of examples components of a computer device that may implement one or more of the features of the security system of FIG. 1.

Referring to FIG. 6, a computing device 600 (such as a computing device of system 300) may implement all or a portion of the functionality described in FIGS. 1-5 and the other examples described above. For example, the computing device 600 may be or may include at least a portion of the control system 120, 200, or 320, the control center 330, or any other component described herein with reference to FIGS. 1-5. The computing device 600 may include a processor 602 which may be configured to execute or implement software, hardware, and/or firmware modules that perform some or all of the functionality described herein with reference to FIGS. 1-5. For example, the processor 602 may be configured to execute or implement software, hardware, and/or firmware modules that perform some or all the functionality described herein with reference to the the control system 120, 200, or 320, the control center 330, or any other component described herein with reference to FIGS. 1-5.

The processor 602 may be a micro-controller, an application-specific integrated circuit (ASIC), or a field-programmable gate array (FPGA), and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, etc., and/or other components of the computing device 600.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, which provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of characterizing security events and responding thereto, comprising:
    for each of a plurality of first security events:
        determining that the first security event has started; and
        collecting, in a database, an event data record associated with the first security event determined to have started, the event data record comprising gait information of a person associated with the first security event;
    for a given security event later than the plurality of first security events:
        determining that the given security event has started;
        detecting given security event data comprising gait information of a person associated with the given security event determined to have started;
        determining a similarity meeting a threshold similarity between i) a query comprising the detected given security event data gait information, and ii) gait information of one or more records of the database; and
        initiating an action based at least in part on determining a similarity meeting the threshold between i) the query and ii) the gait information of one or more records of the database.

2. The method of claim 1, wherein the collecting comprises collecting gait information using at least one of a video imaging device and a millimeter wave transceiver.

3. The method of claim 1, wherein at least one first security event comprises an electronic article surveillance (EAS) alarm.

4. The method of claim 1, wherein the given security event comprises an event other than an electronic article surveillance (EAS) alarm.

5. The method of claim 1, wherein the given security event is a presence of an individual near or entering a controlled area.

6. The method of claim 1, wherein at least one of the plurality of first security events occurs at an area other than the area of the given security event.

7. The method of claim 1, wherein at least one of the records of the database determined to meet a threshold similarity with the query is a set of records associated with a single individual.

8. The method of claim 7, wherein the at least one of the records associated with a single individual is associated with a confidence level that the individual is a repeat offender.

9. The method of claim 1, wherein initiating an action comprises one or more of: notifying a party that the determined similarity meets the threshold; directing one or more sensors towards one or more of a person or an area associated with the given security event; and securing a controlled area.

10. A non-transitory computer-readable medium storing computer executable instructions for identifying a person of interest by a security system, comprising instructions to:
    for each of a plurality of first security events:
        determine that the first security event has started; and
        collect, in a database, an event data record associated with the first security event determined to have started, the event data record comprising gait information of a person associated with the first security event;
    for a given security event later than the plurality of first security events:
        determine that the given security event has started;
        detect given security event data comprising gait information of a person associated with the given security event determined to have started;
        determine a similarity meeting a threshold similarity between i) a query comprising the detected given security event data gait information, and ii) gait information of one or more of records of the database; and
        initiate an action based at least in part on determining a similarity meeting the threshold between i) the query and ii) the gait information of one or more records of the database.

11. The non-transitory computer-readable medium of claim 10, wherein the collecting comprises collecting gait information using at least one of a video imaging device and a millimeter wave transceiver.

12. The non-transitory computer-readable medium of claim 10, wherein at least one first security event comprises an electronic article surveillance (EAS) alarm.

13. The non-transitory computer-readable medium of claim 10, wherein the given security event comprises an event other than an electronic article surveillance (EAS) alarm.

14. The non-transitory computer-readable medium of claim 10, wherein the given security event is a presence of an individual near or entering a controlled area.

15. The non-transitory computer-readable medium of claim 10, wherein at least one of the plurality of first security events occurs at an area other than the area of the given security event.

16. A system comprising:
    one or more processors;
    memory, in communication with the one or more processors, containing instructions that when executed by the one or more processors, causes the system to:
    for each of a plurality of first security events:
        determine that the first security event has started; and
        collect, in a database, an event data record associated with the first security event determined to have started, the event data record comprising gait information of a person associated with the first security event;
    for a given security event later than the plurality of first security events:
        determine that the given security event has started;
        detect given security event data comprising gait information of a person associated with the given security event determined to have started;
        determine a similarity meeting a threshold similarity between i) a query comprising the detected given security event data gait information and ii) gait information of one or more records of the database; and initiating an action based at least in part on determining a similarity meeting the threshold between i) the query and ii) the gait information of one or more records of the database.

17. The system of claim 16, wherein the collecting comprises collecting gait information using at least one of a video imaging device and a millimeter wave transceiver.

18. The system of claim 16, wherein at least one first security event comprises an electronic article surveillance (EAS) alarm.

19. The system of claim 16, wherein the given security event comprises an event other than an electronic article surveillance (EAS) alarm.

20. The system of claim 16, wherein the given security event is a presence of an individual near or entering a controlled area.

* * * * *